United States Patent
Konno et al.

(10) Patent No.: US 7,329,196 B2
(45) Date of Patent: Feb. 12, 2008

(54) GUIDE FOR TRANSMISSION DEVICE

(75) Inventors: Masahiko Konno, Osaka (JP); Shuuji Matsumura, Saitama (JP)

(73) Assignees: I & P Co., Ltd., Saitama (JP); Tsubakimoto Chain Co., Osaka (JP)

( * ) Notice: Subject to any disclaimer, the term of this patent is extended or adjusted under 35 U.S.C. 154(b) by 592 days.

(21) Appl. No.: 10/950,997

(22) Filed: Sep. 27, 2004

(65) Prior Publication Data
US 2005/0107196 A1 May 19, 2005

(30) Foreign Application Priority Data
Nov. 18, 2003 (JP) .............................. 2003-388319

(51) Int. Cl.
*F16H 7/08* (2006.01)
*F16H 7/18* (2006.01)

(52) U.S. Cl. ........................................ 474/111; 474/140

(58) Field of Classification Search ................ 474/111, 474/140, 101, 138
See application file for complete search history.

(56) References Cited

U.S. PATENT DOCUMENTS

| | | | |
|---|---|---|---|
| 4,832,664 A * | 5/1989 | Groger et al. ............... | 474/111 |
| 5,813,935 A | 9/1998 | Dembosky et al. | |
| 6,036,613 A * | 3/2000 | Diehm ......................... | 474/111 |
| 6,086,498 A | 7/2000 | Hashimoto | |
| 6,302,816 B1 * | 10/2001 | Wigsten ....................... | 474/111 |
| 6,599,209 B1 * | 7/2003 | Ullein et al. ................. | 474/111 |
| 6,758,777 B2 * | 7/2004 | Young .......................... | 474/140 |
| 6,835,149 B2 | 12/2004 | Konno et al. | |
| 6,890,277 B2 | 5/2005 | Inoue et al. | |
| 6,913,552 B2 * | 7/2005 | Young .......................... | 474/111 |
| 2001/0039223 A1 * | 11/2001 | Wakabayashi et al. ...... | 474/111 |
| 2002/0042316 A1 * | 4/2002 | Young et al. ................ | 474/140 |
| 2005/0096167 A1 | 5/2005 | Konno et al. | |

FOREIGN PATENT DOCUMENTS

| | | |
|---|---|---|
| EP | 1 267 097 A1 | 12/2002 |
| EP | 1 528 288 A1 | 5/2005 |
| GB | 2 382 637 A | 6/2003 |
| JP | H01-148154 | 10/1989 |
| JP | 10-115352 | 5/1998 |
| JP | 10-267093 | 10/1998 |
| JP | 2002-372111 | 12/2002 |
| JP | 2003-222208 | 8/2003 |
| JP | 2004-125139 A | 4/2004 |

\* cited by examiner

*Primary Examiner*—Marcus Charles
(74) *Attorney, Agent, or Firm*—Howson & Howson LLP

(57) ABSTRACT

In a guide for a transmission chain, a slide rail elongated in the direction of travel of the chain, and having a front surface for sliding engagement with the chain, is supported by a rail support which extends perpendicularly from the back side of the slide rail. The guide is formed by sandwich molding and comprises a glass fiber-reinforced polymer resin forming a core of the rail support, and a wear-resistant polymer resin forming both the slide rail, and a skin layer on the rail support, the skin layer of the rail support being unitary with the slide rail. A plurality of hollow, heat-dissipating, cavities extend inwardly from both sides of the slide rail in directions transverse to the direction of elongation of the slide rail.

6 Claims, 9 Drawing Sheets

GUIDE FOR TRANSMISSION DEVICE

FIELD OF THE INVENTION

This invention relates to a guide for a transmission device, and more particularly to a guide of the type used to prevent vibration, and/or control tension, in an endless, flexible transmission medium such as a roller chain, a silent chain or the like, which transmits power from a driving sprocket to one or more driven sprockets.

BACKGROUND OF THE INVENTION

There are two general categories of guides used in conjunction with an endless, flexible transmission medium: fixed guides and movable guides. When in use, the fixed guide is in sliding contact with the transmission medium, and prevents vibration and wobbling of the transmission medium. The movable guide is also in sliding contact with the transmission medium, and not only prevents vibration and wobbling, but also stretches the transmission medium to prevent transmission failure due to excess tension and excess loosening of the transmission medium.

A typical conventional guide 500 is shown in FIGS. 9 and 10. The conventional guide is described on page 1 of the specification of Japanese patent application No. 2002-293792 and depicted in FIGS. 3 to 6 of the drawings of that application. In the conventional guide, a thin skin layer 510b is formed on the slide rail 510, on which a transmission chain slides. The skin is formed over a core 510 composed of glass fiber-reinforced polyamide 66 resin. When the skin layer 510b wears, the guide must support the traveling chain with its core layer 510b exposed on the sliding surface. Glass fibers, released from the core by the action of the chain, generate an abrasive action, just as if an abrasive material were placed between the guide and the chain. The abrasive action of the glass fibers promotes wear of the guide.

Furthermore heat tends to accumulate not only in the skin layer of the slide rail 510, but also in the core layer 510a. The difference in thermal properties between the glass fiber reinforced polyamide 66 resin forming the core layer 510a, and the polyamide 66 resin forming the skin layer 510b, can cause thermal deformation between the skin layer 510b and the core layer 510a. If the difference in thermal properties is large, cracks are generated in layers 510a and 510b, and separation of these layers can occur. The strength of guide is also impaired by thermal deterioration.

An object of this invention is to solve the above-mentioned problems, and to provide a guide in which heat accumulation in the slide rail portion is suppressed, thermal deterioration is reduced, and smooth siding contact between the guide and the traveling transmission medium can take place over a long period of time.

SUMMARY OF THE INVENTION

The guide in accordance with the invention comprises an elongated slide rail having a surface for sliding engagement with a transmission chain or other traveling, endless, flexible transmission medium. The slide rail also has two opposite side walls. The guide also includes a rail support, integral with the slide rail, and elongated in the direction of elongation of the slide rail. The rail support extends substantially perpendicular to the slide rail in a direction opposite to the direction in which the chain-engaging surface of the slide rail faces. The slide rail is composed of a wear-resistant, polymer resin. The rail support comprises a core composed of a glass fiber-reinforced, high strength, polymer resin and a skin layer composed of the same wear-resistant, polymer resin of which the skin layer of the rail support is composed. The core layer, the skin layer and the slide rail are sandwich molded, and the skin layer and rail support are unitary. Multiple hollow cavities extend inwardly from both sides of the slide rail in directions transverse to the direction of elongation of the slide rail. Each of the hollow cavities has at least one opening at one of the side walls of the slide rail. These hollow cavities form surfaces for dissipating internal heat generated in the slide rail toward the sides of the slide rail.

Preferably, the core layer is entirely within the rail support, the hollow cavities are entirely within the slide rail, and the hollow cavities are spaced from the rail support. The hollow cavities are preferably separated from one another by rib-shaped walls, and may extends from one of the side walls to the other. Each of the hollow cavities may be a substantially cylindrical hole. In a preferred embodiment, the hollow cavities are blind holes, and consist of a first series of substantially cylindrical blind holes extending inward from one side wall of the slide rail, and a second series of substantially cylindrical blind holes extending inward from the other side wall of the slide rail. The blind holes of the first and second series may be in staggered relationship.

Since the slide rail, which is in sliding contact with a traveling transmission medium, is composed of a single polymer resin material, frictional heat due to sliding contact with the transmission chain does not cause cracks, separations or the like, or reduction in guide strength due to thermal deterioration. Furthermore, even if the slide rail wears excessively, glass fibers are not exposed at the surface on which the traveling transmission medium slides. Consequently, smooth sliding contact with the traveling transmission medium can be realized for a long period of time.

Since both sides of slide rail are provided with a large number of heat-dissipating hollow portions, which dissipate internal heat generated in the slide rail toward the sides of the slide rail, heat conduction to the rail support is suppressed, and thermal deterioration of the rail support is reduced significantly.

DETAILED DESCRIPTION OF THE PREFERRED EMBODIMENTS

The guide according to the invention is produced by sandwich molding, and includes a rail support and a slide rail. The rail support has a core formed of a glass fiber-containing high-strength first polymer resin material and a skin layer formed of a wear-resistant second polymer resin material. The slide rail is also formed of the second polymer resin material, and is continuous and unitary with the skin layer of the rail support, and consequently integrally joined with the core. A multiplicity of hollow portions, formed in the slide rail and extending to both sides thereof, promote dissipation of heat generated toward the sides of the slide rail. The dissipation of heat afforded by the multiple hollow portions suppresses heat accumulation, reduces thermal deterioration, and promotes smooth sliding contact of the transmission medium on the rail portion of the guide over a long period of time.

The invention may be embodied in a fixed guide, which prevents vibration and wobbling of a transmission medium, or in a movable guide, which maintains proper tension in a transmission medium.

In the sandwich molding process used to produce the guide in accordance with the invention, two kinds of polymer resin materials are simultaneously or substantially simultaneously injection-molded in a mold having a cavity corresponding to the external shape of the molded product.

Any of a variety of well-known injection molding machines can be used for sandwich molding. In these machines, various sandwich nozzles may be provided. Preferably, however, a parallel type sandwich nozzle is used, in which a switching member known as a torpedo is moved to control the flow of a first polymer resin material for the core and a second polymer resin material for the skin layer. With the parallel-type sandwich nozzle, the ratio of the amounts of injected materials and the injection speeds can be very precisely controlled.

The first and second polymer resin can be any of a wide variety of resins. However, it is preferable in that the materials be fused at their boundary during sandwich molding, and that the materials have chemical affinity and no large difference between their shrinkage properties. Suitable resins include commercially available polyamide resins such as a polyamide 6 resin, a polyamide 66 resin, a polyamide 46 resin, and all aromatic polyamide resins and the like. In addition, glass fiber-reinforced polyamide resins are suitable for use as the material of the core of the rail support.

Figure 1:
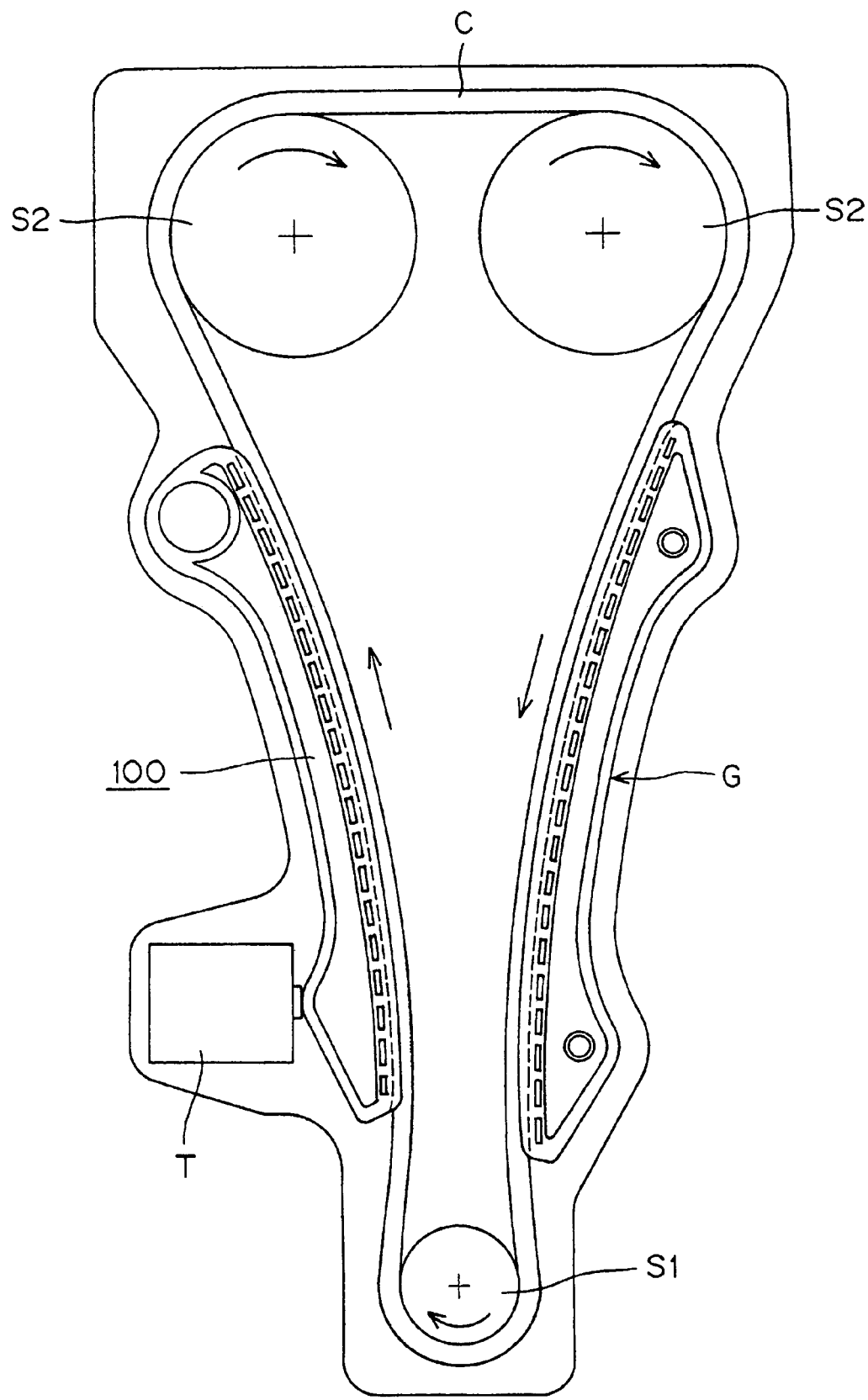
FIG. 1 is schematic front elevational view of a typical transmission incorporating guides in accordance with the invention.

As shown in FIG. 1, guide 100 is used as a pivoted tensioner lever in an automobile engine to maintain tension in a timing chain C, which travels around a driving sprocket S1 on a crankshaft and driven sprockets S2 on a pair of camshafts and slides on a rail portion of the guide.

Figure 2:
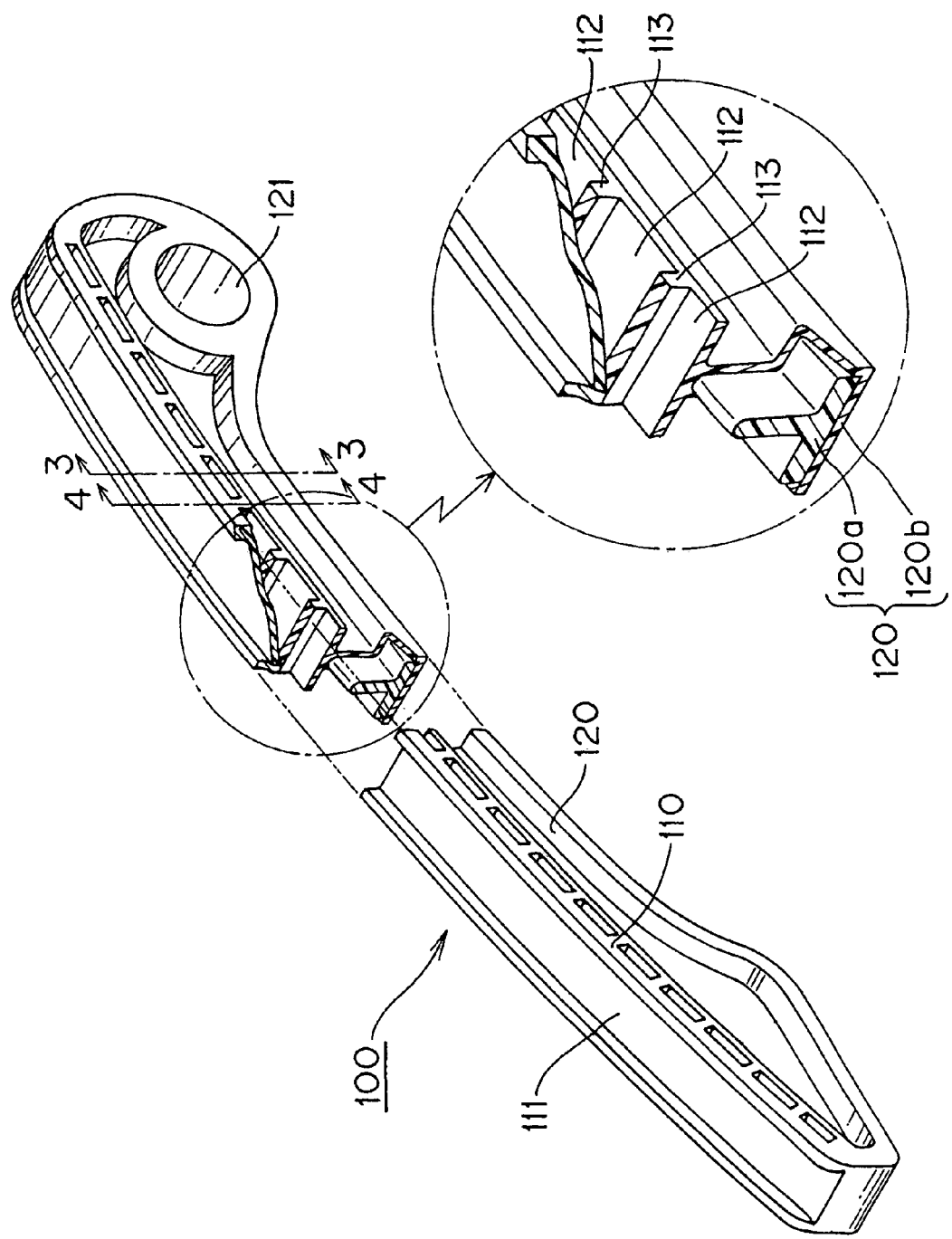
FIG. 2 is a partially cut-away perspective view of a guide in accordance with a first embodiment of the invention, including a detailed enlargement as an auxiliary view.

As shown in FIG. 2, the guide 100 is an elongated structure, comprising a slide rail 110, which has an arc-shaped sliding contact surface 111. When the guide is installed in a transmission, this arc-shaped surface, which extends in the longitudinal direction of the guide, is arrange so that it extends along the direction of travel of the transmission chain C. the guide also has a rail supporting portion 120, which extends lengthwise along the guide, and from the back side of the rail 110 in a direction perpendicular to the sliding contact surface 111. The guide also has a boss 121, formed adjacent one of its ends. This boss is provided with a mounting hole for pivotally mounting the guide on the wall of an engine block.

Figure 3:
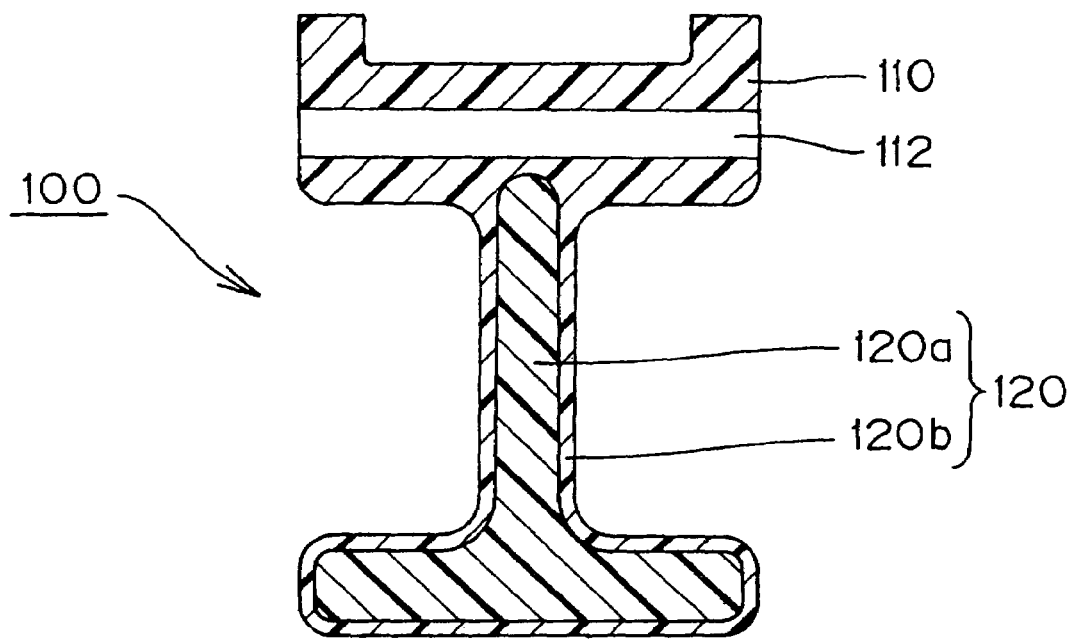
FIG. 3 is an enlarged cross-sectional view taken on section plane 3-3 in FIG. 2.
Figure 4:
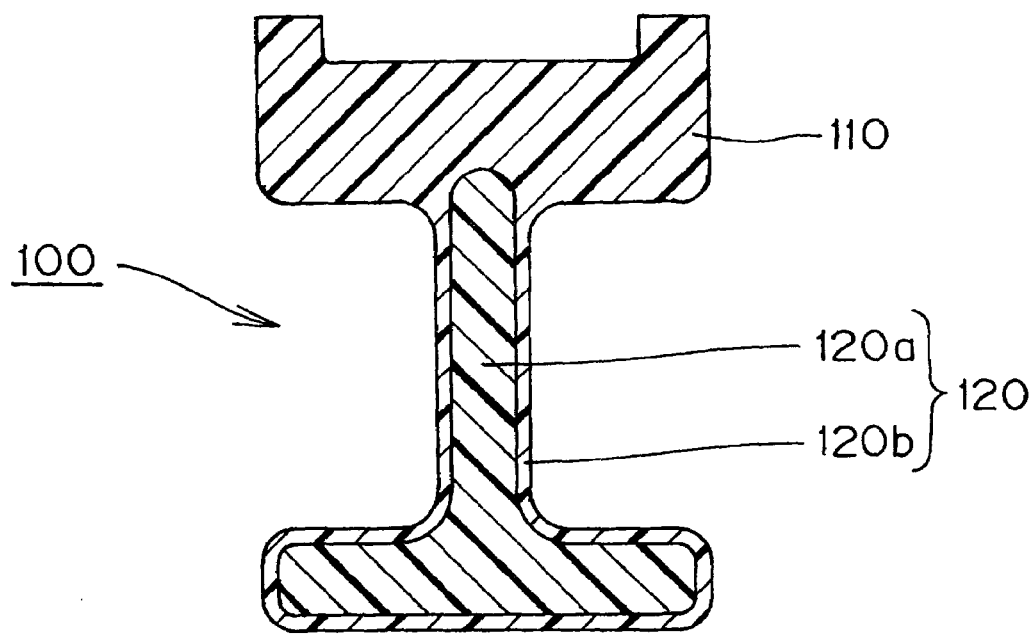
FIG. 4 is an enlarged cross-sectional view taken on section plane 4-4 in FIG. 2.

The core 120a of the rail support 120, shown in FIGS. 3 and 4, is preferably formed of a high strength first polymer resin material composed of a glass fiber-reinforced polyamide 66 resin. The rail support 120, which extends along the longitudinal direction of the guide, supports the slide rail 110 so that the strength required in the high temperature environment in an automotive engine can be maintained at high level for a long period of time.

The skin layer 120b of the rail support 120, shown in FIGS. 3 and 4, is preferably a wear-resistant second polymer resin material composed of a polyamide 66 resin.

Although a glass fiber reinforced polyamide 66 resin is preferred as the first polymer resin material, other polymer resin materials capable of exhibiting high strength over a long period of time while applying tension to a transmission chain can be used. Thus, a polyamide 46 resin or an aromatic polyamide resin other than polyamide 66 may be used. Furthermore, although polyamide 66 resin is preferred as the second polymer resin material, other polymer resins capable of resisting wear over a long period of time while in sliding contact with a transmission chain can be used. For example, a polyamide 46 resin may be used as the skin layer.

The slide rail 110 shown in FIGS. 3 and 4, is preferably a wear-resistant second resin material composed of the same polyamide 66 resin that forms the skin layer 120b of the rail support 120. The slide rail 110 is integrally fused with the skin layer 120b of the rail support 120. As a result, the slide rail 110 and the core layer 120a of the rail support 120 are integrated and reinforce each other so that the guide exhibits superior endurance.

As shown in FIGS. 2 and 3, the slide rail 110 is provided with a large number hollow portions 112, each having a rectangular cross-section, and extending from one side of the slide rail to the other across the direction of the width of the guide. These hollow portions 112 serve to dissipate heat generated internally in the slide rail 110 toward the sides of the rail.

As shown in FIG. 2, rib-shaped walls 113, by which the hollow portions 112 are separated from one another, support and maintain the shape of the arc-shaped sliding contact surface 111.

The guide is sandwich-molded by a sandwich molding machine, in a simple mold having an internal shape corresponding to the desired outer shape of the guide. Before commencement of sandwich molding, a comb tooth-shaped mold core member is inserted into the mold in the direction of the width of the guide, at a location such that the comb teeth form the heat-dissipating hollow portions 112. The wear-resistant second polymer resin material, preferably consisting of a polyamide 66 resin, is injected into the mold through a sandwich nozzle to commence molding of the skin layer 120b of the rail support 120, and the slide rail 110, over the entire outer shape of the molded guide. At the same time, or at substantially the same time, the high strength first polymer resin material, consisting of a glass fiber-reinforced polyamide 66 resin, is injected to form the core layer of the rail support 120. The comb tooth shaped core member blocks the flow of the glass fiber-reinforced polyamide 66 resin into the slide rail 110.

After injection of both resins is complete, the mold is cooled, the comb-tooth core member is withdrawn, and the molded guide is removed from the mold.

In the guide thus produced, the rail support 120 includes a core layer formed of a glass fiber-reinforced polyamide 66 resin, integrated with a skin layer 120b of a polyamide 66 resin, which also forms the slide rail 110. Since the slide rail 110, on which a transmission chain C slides, is composed only of polyamide 66 resin, frictional heat resulting from sliding contact of the transmission chain C with the rail 110, will not cause breakage due causes such as the formation of cracks, or separation of components composed of different resin materials. Moreover, thermal deterioration of the guide can be reduced and its strength can be maintained over a long period of time. Furthermore, even if the arc-shaped sliding contact surface 111 of the slide rail 110 becomes worn excessively, wear of the guide, promoted by the exposure of glass fibers from the core layer as in a prior art, is avoided, and smooth sliding contact with a transmission chain can take place over a long period of time.

Figure 5:
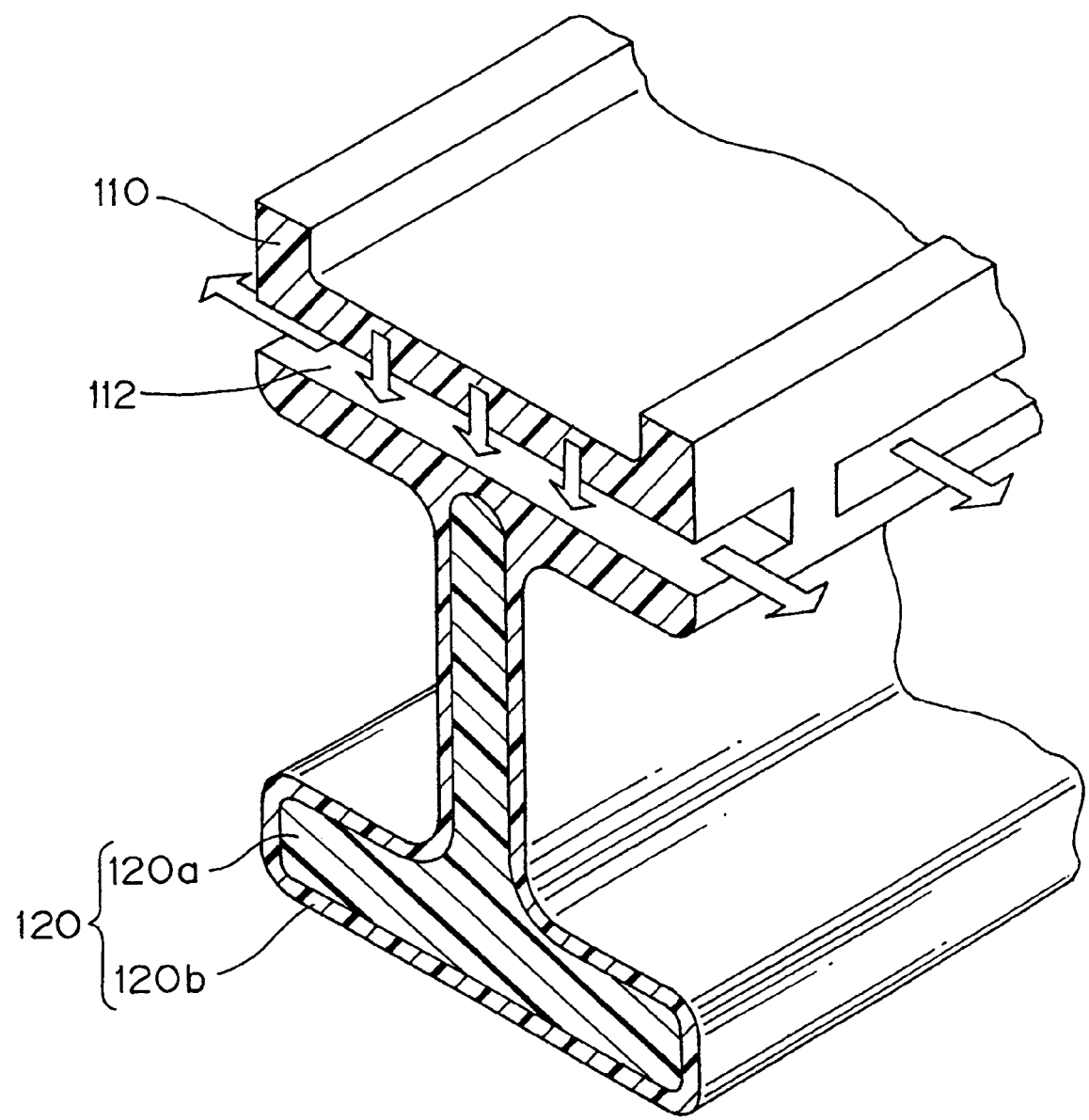
FIG. 5 fragmentary perspective view of the guide of FIGS. 1-4, illustrating the heat-dissipation effect.

As shown in FIG. 5, the internal heat generated in the slide rail 110 is effectively dissipated through the large number of heat-dissipating hollow portion 112 provided in the slide rail 110. The arrows in FIG. 5 denote flow of internal heat dissipated from the heat-dissipating hollow portions 112 toward the sides of the rail. Accordingly, heat conduction to the rail support 120 is significantly suppressed, and thermal deterioration of the rail support 120 is reduced. Furthermore, when the heat-dissipating hollow portions 112 are provided, the rib-shaped walls 113 ensure that arc-shaped sliding contact surface 111 of the slide rail 110 retains its proper shape.

Since both sides of the slide rail 110 are provided with a large number of heat-dissipating hollow portions 112, uneven molding spots, known as "sunk spots" are generated on the arc-shaped sliding contact surface 111 of the slide rail 110 during sandwich molding. The sunk spots have a secondary effect in that engine oil is stored in the sunk spots and exerts a lubricating action on the transmission chain, thereby enhancing the useful life of the guide remarkably.

The skin layer 120b is also formed in the mounting hole of the boss portion provided at one end of the rail support 120 for mounting the guide on an engine block. The polyamide resin, preferably polyamide 66, forming the interior surface of the mounting hole exerts a lubricating effect so that the guide pivots smoothly on a mounting shaft extending into the mounting hole as the transmission chain C tightens and loosens.

Additionally, since the entire guide 100 is formed of a polymer resin, a weight reduction can be realized. Moreover following removal of the guide from the transmission mechanism, the guide can be easily recycled without disassembly and separation of parts.

Figure 6:
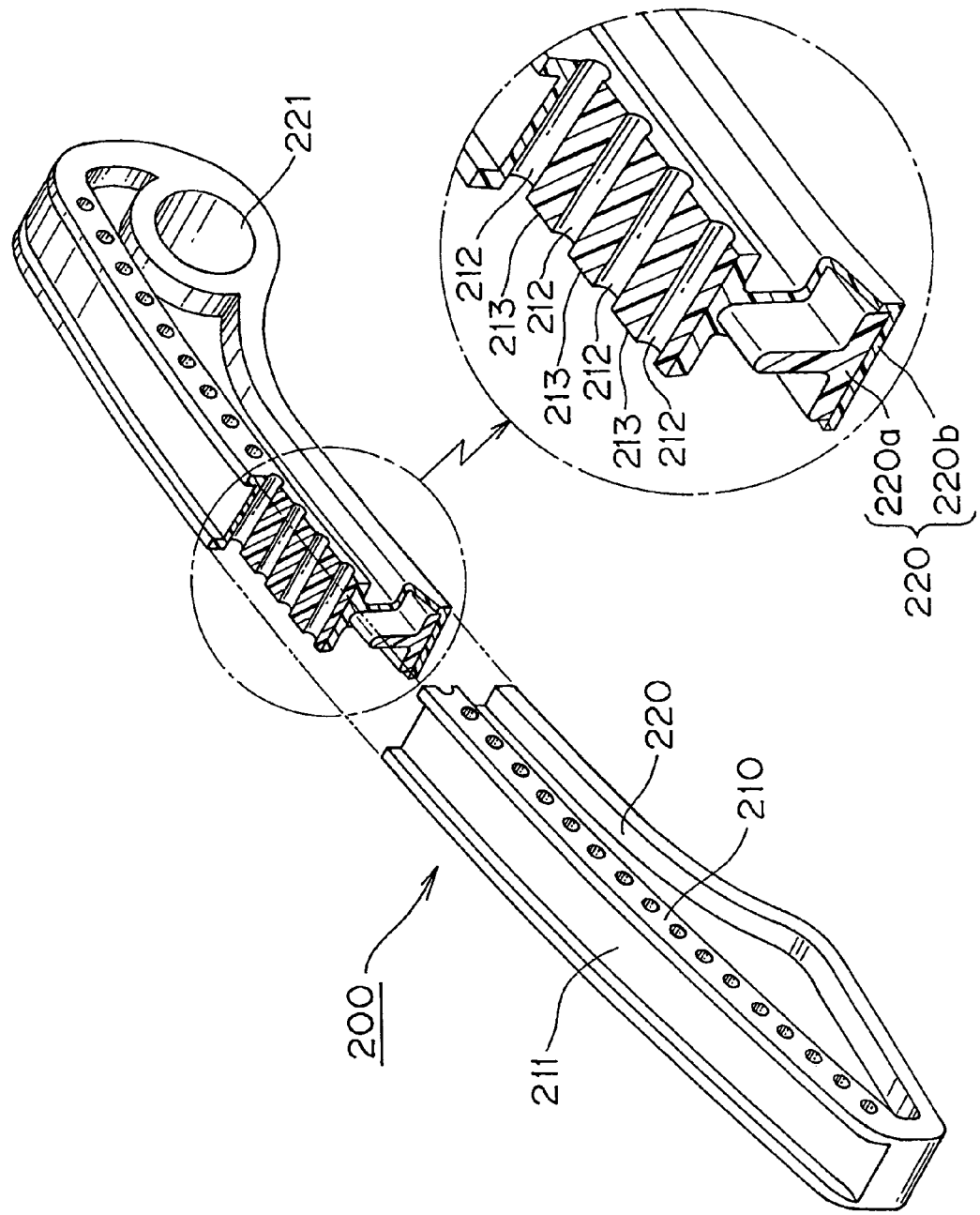
FIG. 6 is a partially cut-away perspective view of a guide in accordance with a second embodiment of the invention, including a detailed enlargement as an auxiliary view.

The guide 200, shown in FIG. 6, comprises a rail support 220 composed of a core 220a and a skin layer 220b. The rail support is formed with a boss 221 adjacent one of its ends. This boss is provided with a mounting hole for pivotally mounting the guide on the wall of an engine block. The basic structure of the guide 200 is substantially the same as that of guide 100. In this case, however, the slide rail 210 is provided with a large number of heat-dissipating hollow portions 212 consisting of holes, each having a circular cross-section, which extend widthwise through the guide from one side to the other. Internal heat generated in the slide rail 210 is dissipated toward the sides of the rail, as in the case of guide 100. Here, the rib-shaped walls 213, which separate the hollow portions 212 from one another are in the form of arches, and provide improved shape retention in the arc-shaped sliding contact surface 211 of the slide rail 210.

Figure 7:
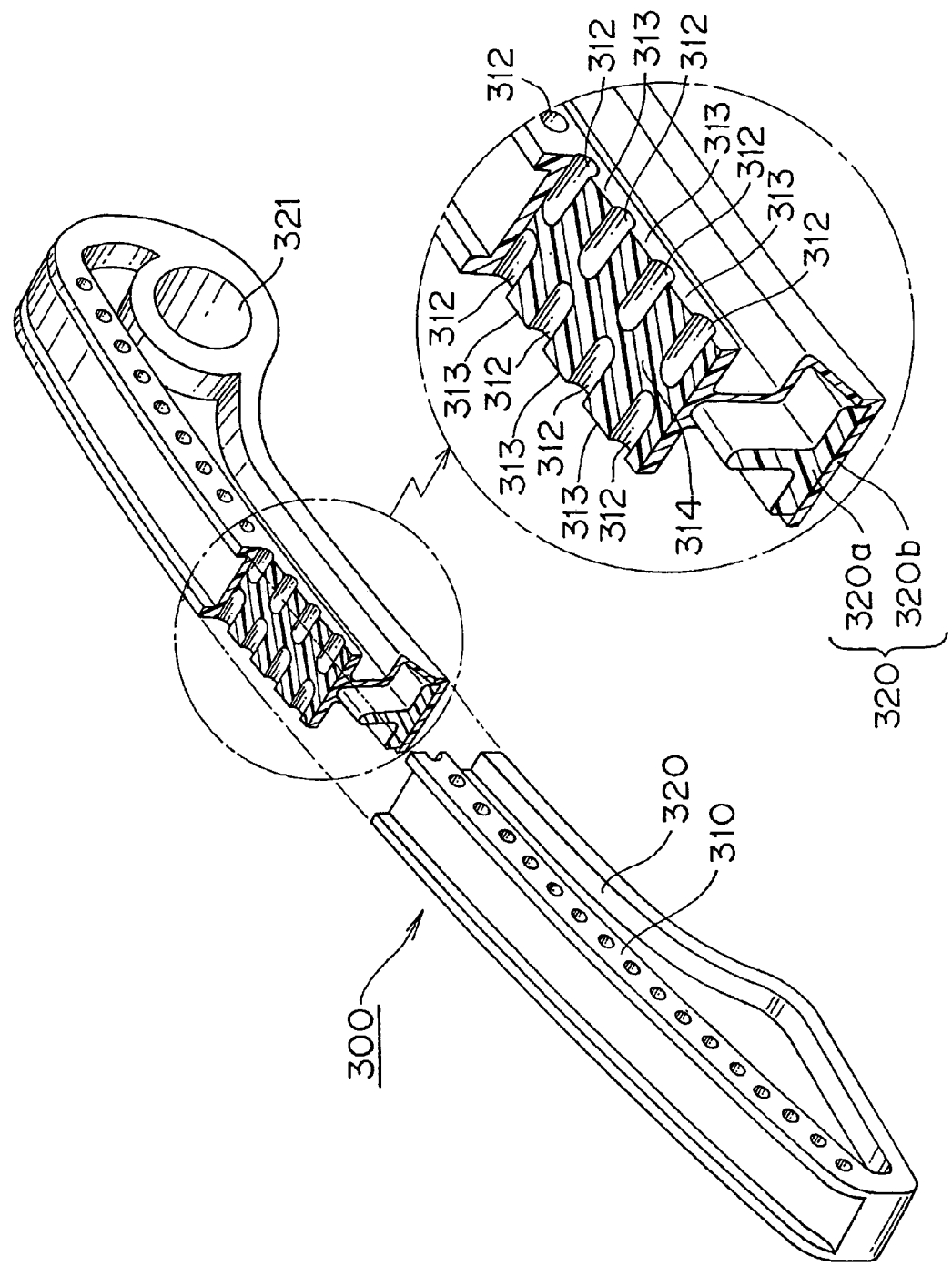
FIG. 7 is a partially cut-away perspective view of a guide in accordance with a third embodiment of the invention, including a detailed enlargement as an auxiliary view.

The guide 300, shown in FIG. 7, comprises a rail support 320 composed of a core 320a and a skin layer 320b. The rail support is formed with a boss 321 adjacent one of its ends. This boss is provided with a mounting hole for pivotally mounting the guide on the wall of an engine block. The basic structure of the guide 300 is substantially the same as that of guides 100 and 200. In this case, however, the heat-dissipating hollow portions are in the form of blind holes 312, each extending in the widthwise direction of the guide from a side thereof. In this embodiment, each blind hole 312 formed on one side of the guide is aligned with a corresponding blind hole 312 formed on the opposite side of the guide. Thus, the heat dissipating hollow portions consist of symmetrically arranged blind holes. The holes depicted in FIG. 7 have a circular cross-section, though they can be made in a variety of other cross-sectional shapes in the molding process, for example a rectangular cross-sectional shape. As in the case of guides 100 and 200, in guide 300, internal heat generated in the slide rail 310 is dissipated toward the sides of the rail.

The guide 300 has a center wall 314, extending in the longitudinal direction of the guide in addition to the inevitably formed rib-shaped walls 313. The strength of the slide rail 310 is complemented by the longitudinally extending center wall 314.

Figure 8:
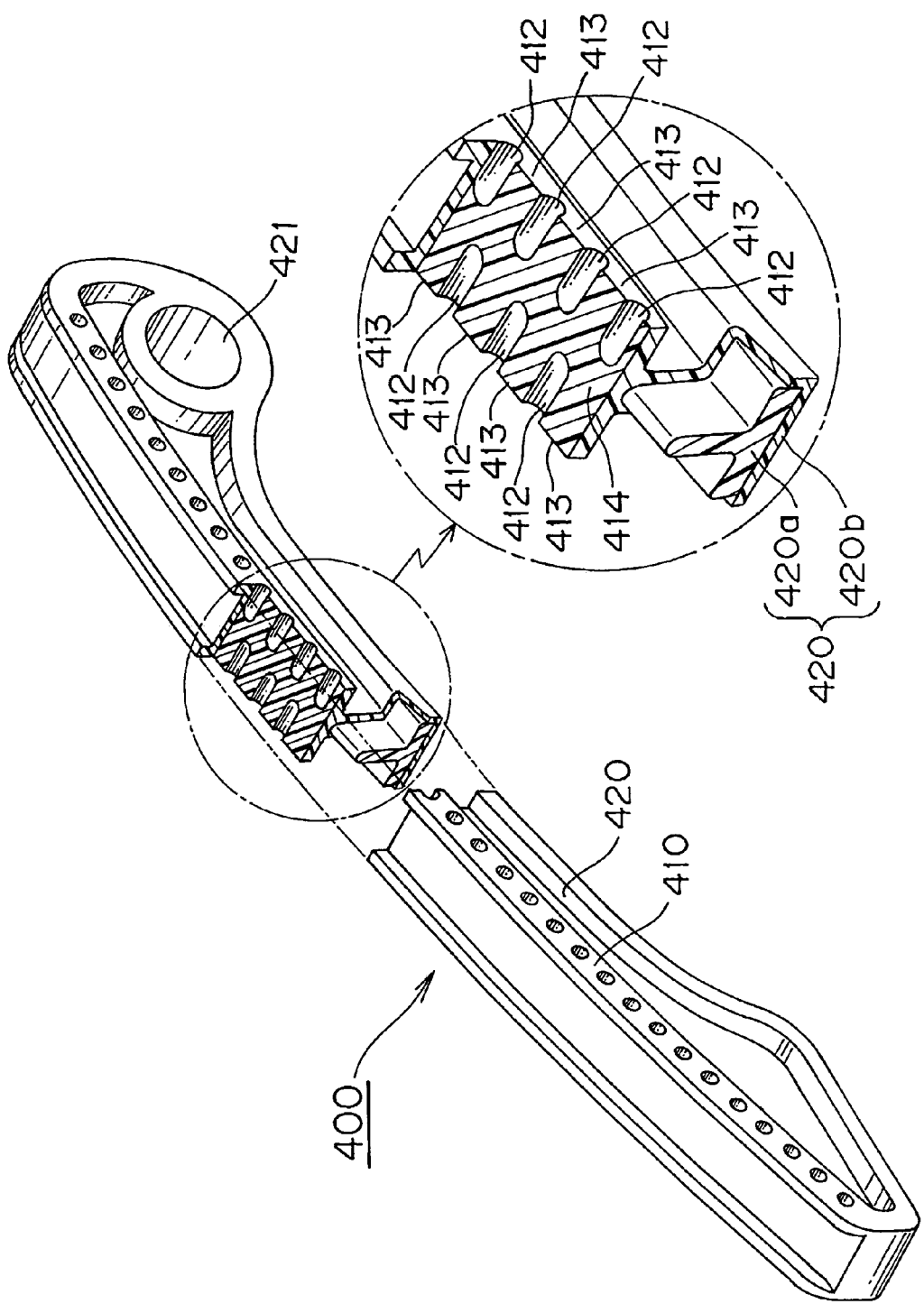
FIG. 8 is a partially cut-away perspective view of a guide in accordance with a fourth embodiment of the invention, including a detailed enlargement as an auxiliary view.
Figure 9:
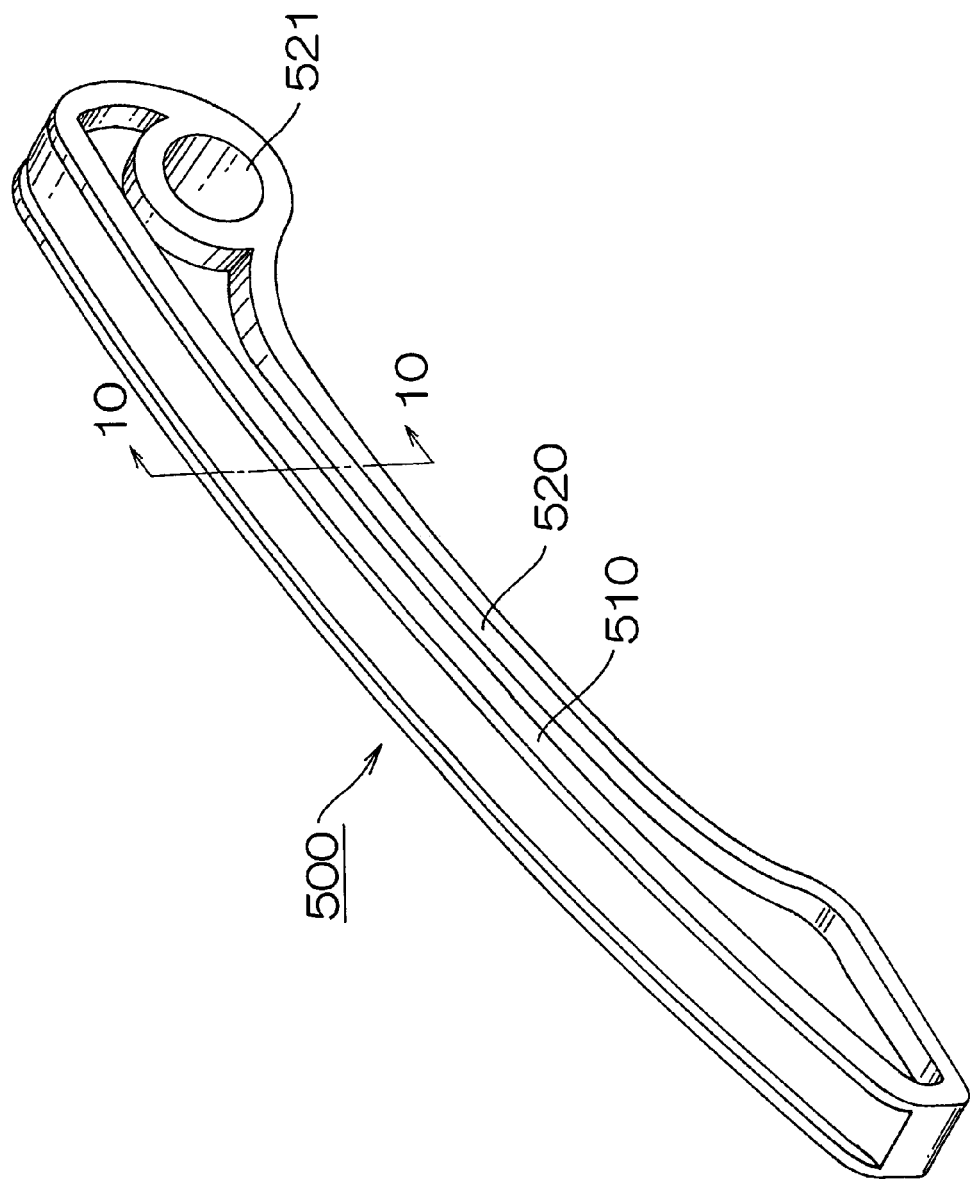
FIG. 9 is a perspective view of a conventional guide.
Figure 10:
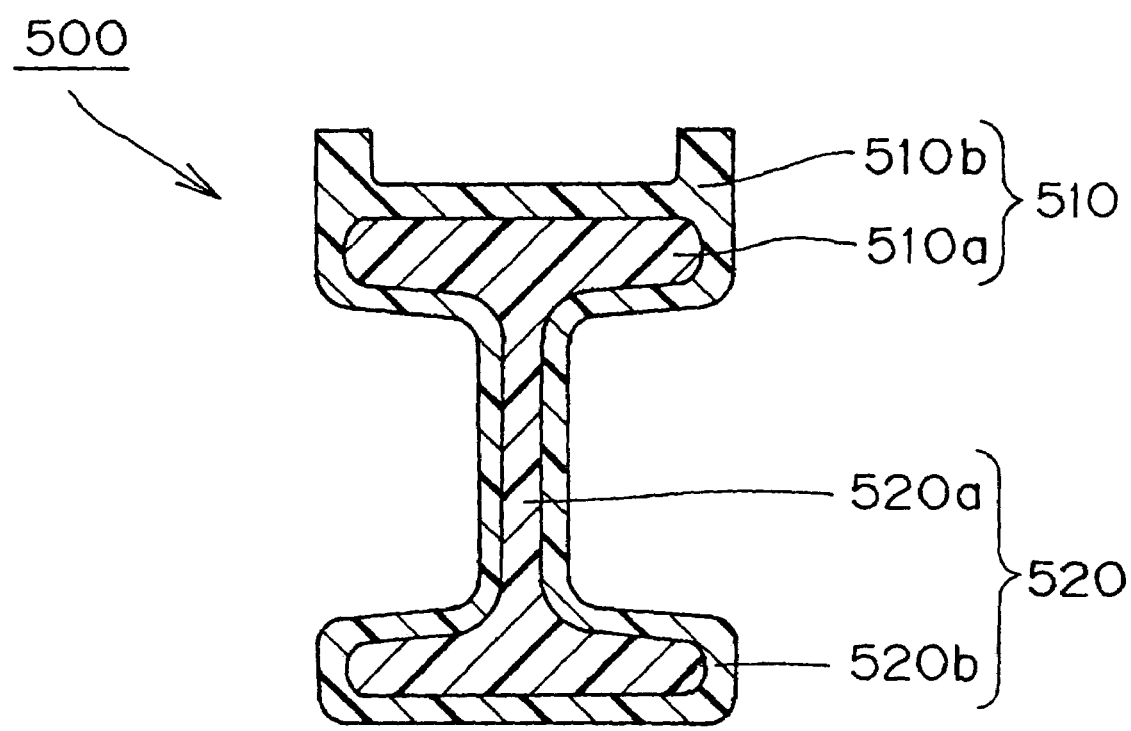
FIG. 10 is an enlarged cross-sectional view taken on section plane 10-10 in FIG. 9.

The 400, shown in FIG. 8, comprises a rail support 420 composed of a core 420a and a skin layer 420b. The rail support is formed with a boss 421 adjacent one of its ends. This boss is provided with a mounting hole for pivotally mounting the guide on the wall of an engine block. The basic structure of the guide 400 is substantially the same as that of guides 100, 200 and 300. In this case, however, the heat-dissipating hollow portions 412 are in the form of blind holes which are in staggered relationship on both sides of the slide rail 410, instead of in aligned relationship as in the case of guide 300 shown in FIG. 7. Here, as in FIG. 7, a center wall 414 extends in the longitudinal direction of the guide, and assists the rib-shaped walls 413, which separate the hollow portions from one another, in supporting and maintaining the shape of the slide rail 410.

Although the several embodiments have been described with reference to a pivoted guide for use with a tensioner T as in FIG. 1, it should be understood that a fixed guide G (FIG. 1), for preventing the vibration and wobbling of a chain or other transmission medium, can also be sandwich molded with heat-dissipating hollow portions, and that similar advantages can be realized in the case of the fixed guide so constructed.

The invention claimed is:

1. A guide for a transmission device comprising:
   an elongated slide rail, said slide rail having a surface facing in a first direction, for sliding engagement with a traveling, endless, flexible transmission medium, and also having two opposite side walls; and
   a rail support, integral with the slide rail, said rail support being elongated in the direction of elongation of the slide rail and extending substantially perpendicular to the slide rail in a direction opposite to said first direction;
   wherein said slide rail is composed of a wear-resistant polymer resin, and said rail support comprises a core composed of a glass fiber-reinforced, high strength, polymer resin and a skin layer composed of the same wear-resistant, polymer resin of which said slide rail is composed;
   wherein the core layer, the skin layer and the slide rail are sandwich molded, said skin layer and said rail support are unitary, and a plurality of hollow cavities extend inwardly from both sides of said slide rail in directions transverse to the direction of elongation of the slide rail, the hollow cavities comprising at least one series of cavities, the cavities in each said series being distributed substantially uniformly throughout substantially the entire length of the slide rail, and each of said hollow cavities having at least one opening at one of said side walls of the slide rail, said hollow cavities forming surfaces for dissipating internal heat generated in the slide rail toward the sides of the slide rail; and wherein said core layer is entirely within said rail support, said hollow cavities are entirely within said slide rail, and said hollow cavities are spaced from said rail support.

2. A guide for a transmission device according to claim 1, in which said hollow cavities are separated by rib-shaped walls.

3. A guide for a transmission device according to claim 1, in which each of said hollow cavities extends from one of said side walls to the other.

4. A guide for a transmission device according to claim 1, in which each of said hollow cavities is a substantially cylindrical hole having a circular cross-section.

5. A guide for a transmission device according to claim 1, in which each of said hollow cavities is a substantially cylindrical blind hole having a circular cross-section.

6. A guide for a transmission device comprising:
   an elongated slide rail, said slide rail having a surface facing in a first direction, for sliding engagement with a traveling, endless, flexible transmission medium, and also having two opposite side walls; and
   a rail support, integral with the slide rail, said rail support being elongated in the direction of elongation of the slide rail and extending substantially perpendicular to the slide rail in a direction opposite to said first direction;

wherein said slide rail is composed of a wear-resistant polymer resin, and said rail support comprises a core composed of a glass fiber-reinforced, high strength, polymer resin and a skin layer composed of the same wear-resistant, polymer resin of which said slide rail is composed;

wherein the core layer, the skin layer and the slide rail are sandwich molded, said skin layer and said rail support are unitary, and a plurality of hollow cavities extend inwardly from both sides of said slide rail in directions transverse to the direction of elongation of the slide rail, each of said hollow cavities having at least one opening at one of said side walls of the slide rail, said hollow cavities forming surfaces for dissipating internal heat generated in the slide rail toward the sides of the slide rail; and wherein said hollow cavities consist of a first series of substantially cylindrical blind holes extending inward from one side wall of the slide rail and a second series of substantially cylindrical blind holes extending inward from the other side wall of the slide rail, and in which the blind holes of the first and second series are in staggered relationship.

* * * * *